(12) United States Patent
Park et al.

(10) Patent No.: US 8,699,822 B2
(45) Date of Patent: Apr. 15, 2014

(54) METHOD AND APPARATUS FOR BLENDING IMAGES

(75) Inventors: Sung-Chan Park, Suwon-si (KR);
Hyun-Hwa Oh, Hwaseong-si (KR);
Jae-Hyun Kwon, Hwaseong-si (KR);
Seong-Deok Lee, Suwon-si (KR);
Won-Hee Choe, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 756 days.

(21) Appl. No.: 12/886,114

(22) Filed: Sep. 20, 2010

(65) Prior Publication Data

US 2011/0069906 A1  Mar. 24, 2011

(30) Foreign Application Priority Data

Sep. 23, 2009  (KR) .................. 10-2009-0089875

(51) Int. Cl.
*G06K 9/32* (2006.01)

(52) U.S. Cl.
USPC ........... 382/294; 382/254; 382/275; 382/276; 382/284; 382/298; 348/221.1; 348/239; 358/450; 358/540

(58) Field of Classification Search
None
See application file for complete search history.

(56) References Cited

U.S. PATENT DOCUMENTS

| 6,271,847 B1 * | 8/2001 | Shum et al. ................. 345/418 |
| 6,744,933 B2 * | 6/2004 | Lai et al. ..................... 382/294 |
| 2008/0055683 A1 | 3/2008 | Choe et al. |
| 2010/0013963 A1 * | 1/2010 | Jannard et al. ............... 348/242 |
| 2011/0216985 A1 * | 9/2011 | Peng et al. .................. 382/260 |

FOREIGN PATENT DOCUMENTS

| JP | 2009-104228 | 5/2009 |
| KR | 10-2005-0103031 | 10/2005 |
| KR | 10-2008-0021181 | 3/2008 |
| KR | 10-2008-0022399 | 3/2008 |

OTHER PUBLICATIONS

Sidibe et al. "Ghost Detection and Removal in High Dynamic Range Images.", Jun. 2009, EUSIPCO 2009.*
Reinhard et al. "High Dynamic Range Imaging Acquisition, Display, and Image-Based Lighting, Chapter 4, HDR image capture", 2006, Elsevier Inc, pp. 122-128, 147-152, and 359.*
Khan et al. "Ghost removal in high dynamic range images", Oct. 2006, IEEE International Conference on Image Processing, pp. 2005-2008.*

(Continued)

*Primary Examiner* — Matthew C Bella
*Assistant Examiner* — Jason Heidemann
(74) *Attorney, Agent, or Firm* — NSIP Law

(57) ABSTRACT

A method and apparatus may include aligning a reference image and an input image through ROI-based image alignment; detecting an ROI associated with an incompletely aligned region in the aligned image; and blending the aligned reference image and input image by using a plurality of weights which are attenuated according to a spatial distance from a boundary of the detected ROI. In addition, the method and apparatus may include aligning a reference image and an input image through image alignment based on an $n^{th}$ region of interest (ROI) which is detected at a previous stage; detecting another ROI associated with an incompletely aligned region in the aligned image; and blending the aligned image in the other ROI and an $(n+1)^{th}$ blended image, which is input from a next stage, in a region outside the other ROI, and outputting the last blended image to the previous stage.

22 Claims, 7 Drawing Sheets

(56) References Cited

OTHER PUBLICATIONS

Pedone et al. "Constrain propagation for ghost removal in high dynamic range images", 2008, International Conference on Computer Vision Theory and Applications.*

Uyttendaele et al. "Eliminating ghosting and exposure artifacts in image mosaics", 2001, Computer Vision and Pattern Recognition (CVPR 2001), pp. 509-516.*

Agarwala et al., "Interactive Digital Photomontage," *ACM Transactions on Graphics* (*TOG*), vol. 23, Issue 3, Aug. 2004, pp. 1-9.

Gallo et al., "Artifact-free High Dynamic Range Imaging," *In Proceeding of the International Conference on Computational Photograph*, 2009, pp. 1-7.

Xiong et al., "Registration Calibration and Blending in Creating High Quality Panoramas," *In Proceeding of the 4th IEEE Workshop on Applications of Computer Vision*, Oct. 1998, pp. 1-6.

\* cited by examiner

METHOD AND APPARATUS FOR BLENDING IMAGES

CROSS REFERENCE TO RELATED APPLICATION(S)

This application claims the benefit under 35 U.S.C. §119 (a) of Korean Patent Application No. 10-2009-0089875, filed on Sep. 23, 2009, the entire disclosure of which is incorporated herein by reference for all purposes.

BACKGROUND

1. Field

The following description relates to a method and apparatus for blending a plurality of images.

2. Description of the Related Art

Image blending involves compiling multiple images to achieve a desired effect. Image blending may be applied to high dynamic range imaging (HDRI) for merging a number of standard photographs captured using exposure bracketing into an HDR image. Further, the image blending may be applied to panoramic imaging for merging a number of partly overlapped photographs into a wide-angle view or representation of a physical space. In addition, the image blending may be applied to photomontages for making a composite photograph by cutting and joining a number of other photographs. For example, the photomontage may be used in making a composite photograph by cutting and joining desired parts of other photographs. Such techniques may be applied to various products, such as analog cameras, digital cameras, and camcorders, i.e., in the image capture device. The techniques may be further used in image processing using computers, i.e., outside of the image capture device.

For such image blending, multiple images need to be aligned and a difference in brightness level at a stitched boundary of two different regions needs to fall within a predetermined limit. Further, there should be no artifacts in the boundary between the two different regions so that the blended image appears naturally, i.e., so that the output appears that the images were originally combined with no visible seams or inconsistencies.

However, it is very difficult for images with noise or with a portion in active motion to be blended without decreasing dynamic range thereof or causing motion artifacts. Using an optical flow technique to solve the motion artifacts may result in a decreased matching level and an increased complexity of calculation for images with considerable motion.

SUMMARY

In one general aspect, there is provided a method for blending images, including: aligning a reference image and an input image through region of interest (ROI)-based image alignment, detecting an ROI associated with an incompletely aligned region in the aligned image, and blending the aligned input image and reference image by using a plurality of weights which are attenuated according to a spatial distance from a boundary of the detected ROI.

The method may further include that blending the aligned input image and reference image includes blending two images by taking the reference image in the ROI and the input image in a region outside the ROI.

The method may further include that detecting the ROI includes detecting a ghost.

The method may further include that the weights are more greatly attenuated at an edge of an image than at other portions of the image.

The method may further include that the weights are attenuated depending on a difference in brightness level which occurs in the boundary of the ROI.

In another general aspect, there is provided a method for blending images, including: aligning a reference image and an input image through image alignment based on an $n^{th}$ region of interest (ROI) which is detected at a previous stage, detecting another ROI associated with an incompletely aligned region in the aligned image, blending the aligned input image in the other ROI and an $(n+1)^{th}$ blended image, which is input from a next stage, in a region outside the other ROI, and outputting the last blended image to the previous stage.

The method may further include that detecting the other ROI includes detecting a ghost.

The method may further include outputting an $(n+1)^{th}$ ROI, which is an overlapped portion between the $n^{th}$ ROI and the other ROI, to a next stage.

The method may further include that blending the aligned input image and the $(n+1)^{th}$ blended image includes blending the two images by using a plurality of weights which are attenuated according to a spatial distance from a boundary of the other ROI.

The method may further include that the weights are more greatly attenuated at an edge of an image than at the other portions of the image.

The method may further include that the weights are attenuated depending on a difference in brightness level which occurs in the boundary of the other ROI.

In another general aspect, there is provided an image blender, including: an image aligning unit configured to align a reference image and an input image through ROI-based image alignment, an ROI detecting unit configured to detect an ROI associated with an incompletely aligned region by detecting motion in an aligned image output from the image alignment unit, a weight calculating unit configured to calculate a plurality of weights which are attenuated depending on a spatial distance from a boundary of the ROI detected by the ROI detecting unit, and an image blending unit configured to blend an aligned image output from the image aligning unit and a reference image according to the weights which are calculated by the weight calculating unit.

The image blender may further include that the ROI detecting unit includes a ghost detecting unit configured to detect a ghost.

In another general aspect, there is provided an image blender, including: an image aligning unit configured to align a reference image and an input image through image alignment, based on an $n^{th}$ ROI which is detected at a previous stage, an ROI detecting unit configured to detect another ROI associated with an incompletely aligned region, based on motion detection in an aligned image output from the image aligning unit, and an image blending unit configured to: blend the aligned input image in the other ROI and an $(n+1)^{th}$ blended image, which is input from a next stage, in a region outside the other ROI, and output the last blended image to the previous stage.

The image blender may further include that the ROI detecting unit includes a ghost detecting unit configured to detect ghosts, based on motion detection in the aligned image output from the image aligning unit.

The image blender may further include that the ROI detecting unit is further configured to output an $(n+1)^{th}$ ROI, which is an overlapped portion between the $n^{th}$ ROI and the other ROI, to a next stage.

The image blender may further include a weight calculating unit configured to calculate a plurality of weights, the image blending unit being further configured to blend the two images using the plurality of weights, the plurality of weights being attenuated depending on a spatial distance from a boundary of the other ROI.

In another general aspect, there is provided an image blending apparatus, including: a plurality of image blenders, at least two of the plurality of image blenders including: an image aligning unit configured to align a reference image and an input image through image alignment, based on an $n^{th}$ ROI which is detected at a previous stage, an ROI detecting unit configured to detect another ROI associated with an incompletely aligned region, based on motion detection in an aligned image output from the image aligning unit, and an image blending unit configured to: blend the aligned reference image in the other ROI and an $(n+1)^{th}$ blended image, which is input from a previous stage, in a region outside the other ROI, and output the last blended image to the previous stage.

The image blending apparatus may further include that the plurality of image blenders are cascaded.

The image blending apparatus may further include that an initial ROI of the first offstage image blenders is set to a low-brightness region, a high-brightness region.

A computer-readable information storage medium may store a program for causing a computer to implement the above methods.

Other features and aspects may be apparent from the following detailed description, the drawings, and the claims.

Figure 1:
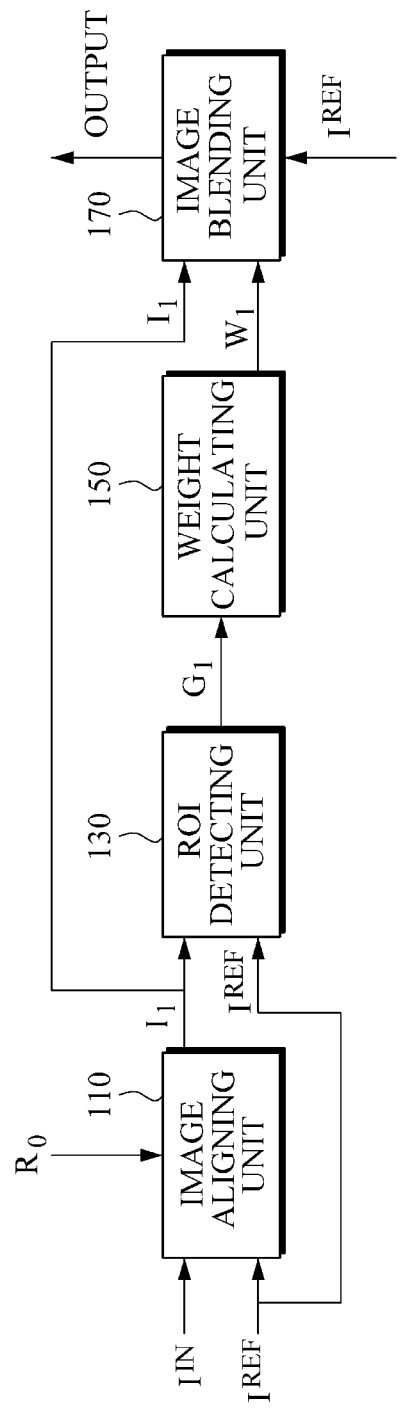
FIG. 1 is a block diagram of an image blender according to an example embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for is increased clarity and conciseness.

FIG. 1 is a block diagram of an image blender according to an example embodiment.

The image blender may include an image aligning unit 110, a region of interest (ROI) detecting unit 130, a weight calculating unit 150, and an image blending unit 170. The image aligning unit 110 may align a reference image and an input image according to ROI-based image alignment. The ROI detecting unit 130 may detect an ROI associated with an incompletely aligned region by detecting motion in an aligned image output from the image aligning unit 110. The weight calculating unit 150 may calculate a plurality of weights which are attenuated depending on a spatial distance from a boundary of the ROI detected by the ROI detecting unit 130. The image blending unit 170 may blend the reference image and the aligned image output from the image aligning unit 110 according to the weights calculated by the weight calculating unit 150.

The units shown in FIG. 1 may be individually separated or incorporated into a single entity. For example, signal processors or the image blender may be implemented as a field programmable gate array (FPGA) or gate array (GA). In another embodiment, the units may be implemented as a computer and program code. In still another embodiment, the units may be implemented as a digital signal processor and a set of commands executed by the digital signal processor in an analog digital camera, a digital camera or a camcorder.

An initial ROI may be a low-brightness region with a brightness lower than a predetermined value in an example embodiment. However, the initial ROI may be a high-brightness region.

The image aligning unit 110 may align a reference image $I^{REF}$ and an input image $I^{IN}$ through ROI ($R_0$)-based image alignment. Examples of the ROI-based image alignment may include a hierarchical pyramid structure of alignment, which has been proposed by the present inventor, and other known alignment schemes. The output image may be well aligned in the initial ROI, which may be a low brightness region, but may be incompletely aligned in the other region.

The ROI detecting unit 130 may detect another ROI associated with the incompletely aligned region in the aligned image. For example, the ROI may be a ghost region where motion is detected. In the current example, the ROI detecting unit 130 may be implemented as a ghost detecting unit. The term "ghost" refers to a phenomenon in which images overlap due to motion of a subject in the images when the images are merged or stitched.

The weight calculating unit 150 may calculate a plurality of weights which are attenuated according to a spatial distance from a boundary of the ROI detected by the ROI detecting unit 130. A ROI may be a space between two squares. By applying different weights depending on a spatial distance from the boundary of the ROI, a difference in brightness level may be improved and motion artifacts may be reduced in the boundary of the ROI.

In an example, a detected ROI may be set to have a weight of "1", and a region farther from the boundary of the ROI may be set to have a lower weight. In other words, the weights may be attenuated according to a spatial distance from the boundary of the ROI.

In another example, where an ROI is denoted by "R" and a distance range parameter is denoted by "a", a kernel "K" is defined as follows:

$$K_i = \begin{bmatrix} 1 - \|ax\|_i, & \|ax\|_i < 1 \\ 0, & \text{otherwise} \end{bmatrix} \quad (1)$$

$$K_N = \exp\left(-\frac{1}{2}\|ax\|_2\right) \quad (2)$$

In one example, each pixel may have a different region by adjusting the distance range parameter.

Using the kernel K, the weights may be attenuated according to a spatial distance from the center as follows:

$$W(x) = \max_{k \in I} K(k-x)\delta_R(k), \quad \delta_R(k) = \begin{cases} 1, & k \in R \\ 0, & k \notin R \end{cases} \quad (3)$$

The image blending unit 170 may blend two images according to the weights calculated by the weight calculating unit 150. That is, the image blending unit 170 may use the above-mentioned weight function W(x) to blend a reference image $I^{REF}(x)$ in an ROI and an input image $I_k(x)$ in another region as follows:

$$I_{out}(x) = W(x)I^{REF}(x) + \sum_k (1 - W(x))I_k(x) \quad (4)$$

In one example, the reference image may be taken in the ROI and the input image may be taken in the region other than the ROI when the two images are blended. In the embodiment shown, as a well aligned image may be taken in the ROI showing no ghost, and a reference image as the input image may be taken in the other region, motion artifacts may be reduced.

Figure 2:
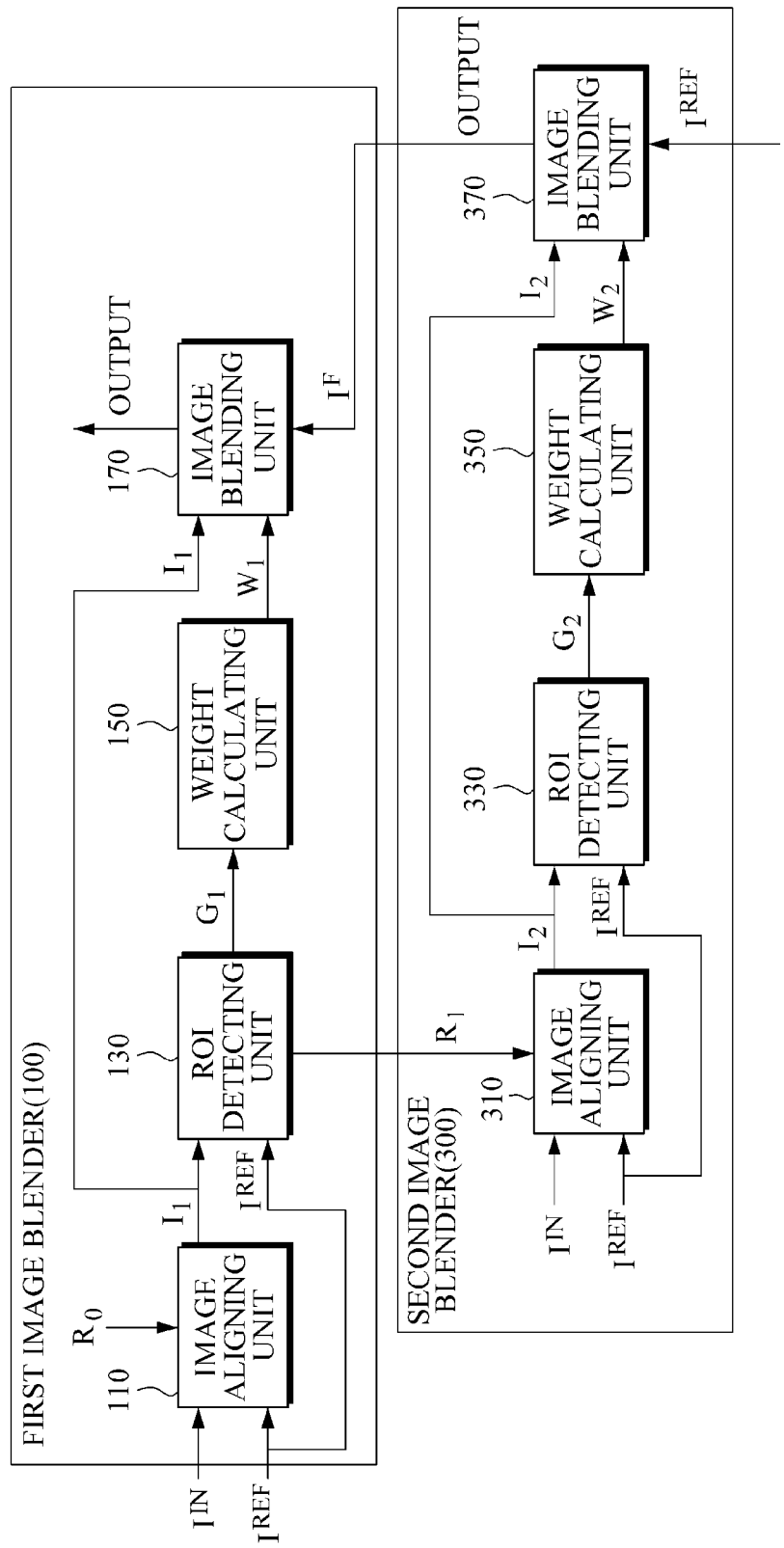
FIG. 2 is a block diagram of a cascaded structure of two image blenders according to an example embodiment.

However, the weights may be attenuated in a gradual curve. Further, the weight values may not need to be symmetrically attenuated with respect to the boundary of the ROI. In one embodiment, the weights may be set to be more significantly attenuated at an edge than at other portions. This may prevent the corresponding region of the image from deteriorating in sharpness due to feathering in the weights FIG. 2 is a block diagram of an image blender according to another example embodiment. FIG. 2 is a block diagram of a cascaded structure of two image blenders according to an example embodiment.

As shown in FIG. 2, the cascaded image blender may include a first image blender 100 and a second image blender 300 which may be cascaded. An overlapped portion between an ROI detected by an ROI detecting unit 130 of the first image blender 100 and an ROI detected by an image aligning unit 130 of the first image blender 100 may be set to an ROI of an image aligning unit 310 of the second image blender 300. Further, an output image from an image blending unit 370 of the second image blender 300 may be input to an image blending unit 170 of the first image blender 100.

That is, in the first image blender 100, the image aligning unit 110 may align an initial ROI, and the ROI detecting unit 130 may detect a misaligned region. In the second image blender 300, the image aligning unit 310 may align images in the narrowed ROI, and the ROI detecting unit 330 may detect a misaligned ghost region. The image blending unit 370 may blend the initial ROI in an ROI $G_2$ and a well-aligned $I_2$ image in the other region, and may output the blended image. The image blending unit 170 of the first image blender 100 may blend a well-aligned $I_1$ image in an ROI $G_1$ detected by the ROI detecting unit 130 and the output image of the second image blender 300 in the other region, and may output the blended image.

The image aligning unit 110 of the first image blender 100 may process the ROI into a well-aligned low-brightness region using a hierarchical pyramid structure of alignment. The ROI $G_1$ may then be calculated by detecting a ghost between the aligned image $I_1$ and the reference image.

The image $I_2$ may then be calculated by performing realignment upon a region R1, which may be an overlap region between the ghost-detected image $G_1$ and the low-brightness ROI of the first image blender. The ROI $G_2$ may then be calculated by detecting a ghost. Then, a final image may be output by performing ROI-based blending of the $I_2$ image and the reference image $I^{REF}$ in the ROI $G_2$, and performing ROI-based blending of the $I_1$ image and the previously blended image in the ROI $G_1$.

This process may be represented in two stages when ROI-based deghosting and ROI-based image alignment are considered as being a single module. For example, an image $I_k$ may be calculated by receiving an ROI $R_{k-1}$ from the previous stage and performing image alignment for the ROI $R_{k-1}$, and an image $G_k$ may be calculated by detecting a ghost using the images $I_k$ and $I_{REF}$.

In this manner, $I_k$ and $G_k$ may be calculated for each level k from low to high levels. The following operation may then be performed level by level from high to low levels.

That is, a blending weight $W_k$ may be calculated using $G_k$, the image $I_k$ and the image $I_{k+1}^F$ may be input and blended, and the resultant image $I_k^F$ may be transferred to a next lower level. Finally, the image $I_1^F$ may be output as a last image at level 1. In this case, the input $R_0$ at level 1 may become an initial ROI, and the output may become the last blended image. If the highest level is K, the input image $I_{k+1}^F$ may become $I_{REF}$ at the level K.

Figure 4:
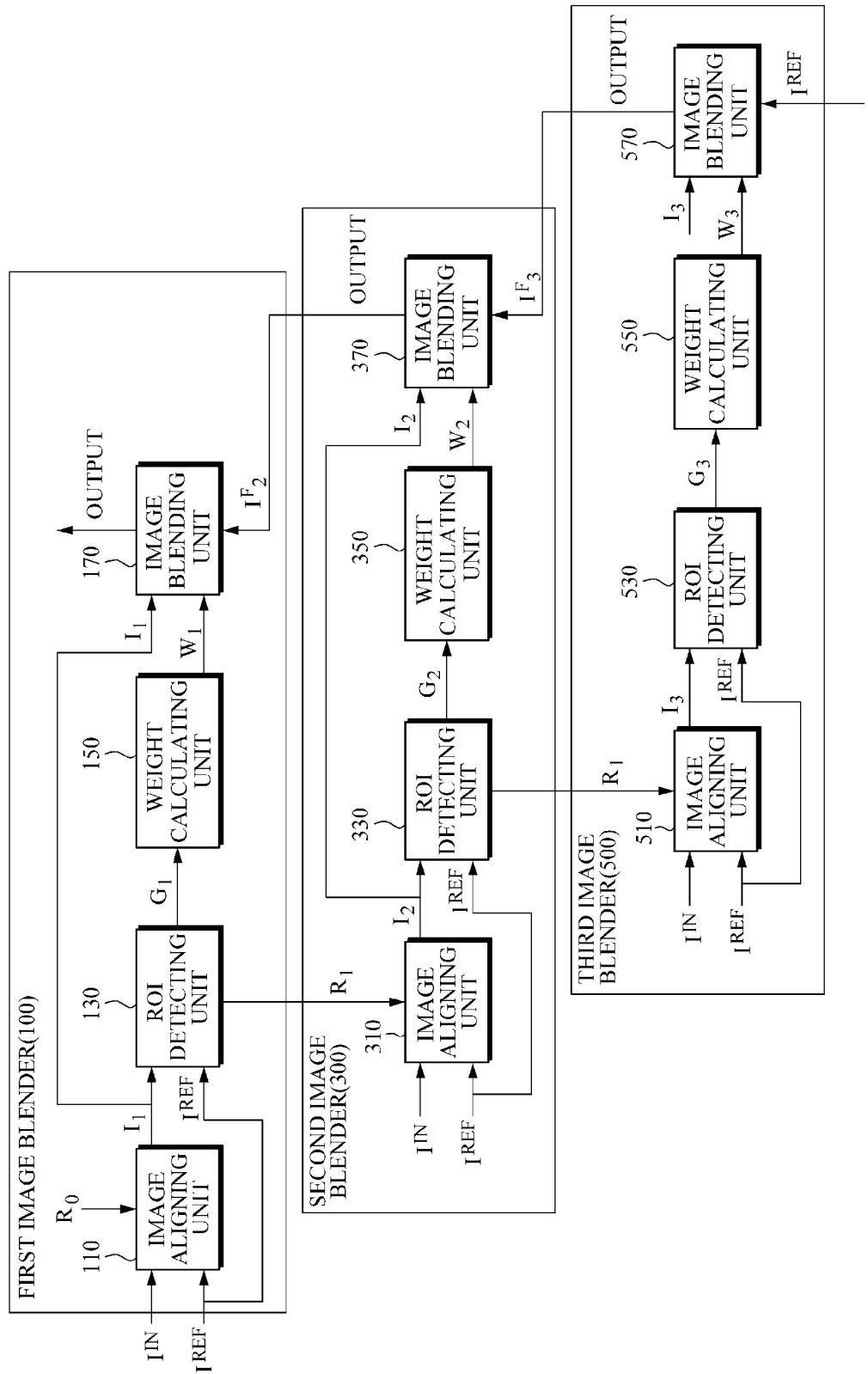
FIG. 4 is a block diagram of a cascaded structure of a plurality of image blenders according to an example embodiment.

This may be represented in three stages as shown in the example of FIG. 4. The alignment may be performed once, as shown in the example of FIG. 1. By iterating the same process in this manner, it is possible to increasingly extend the alignment region.

Figure 3:
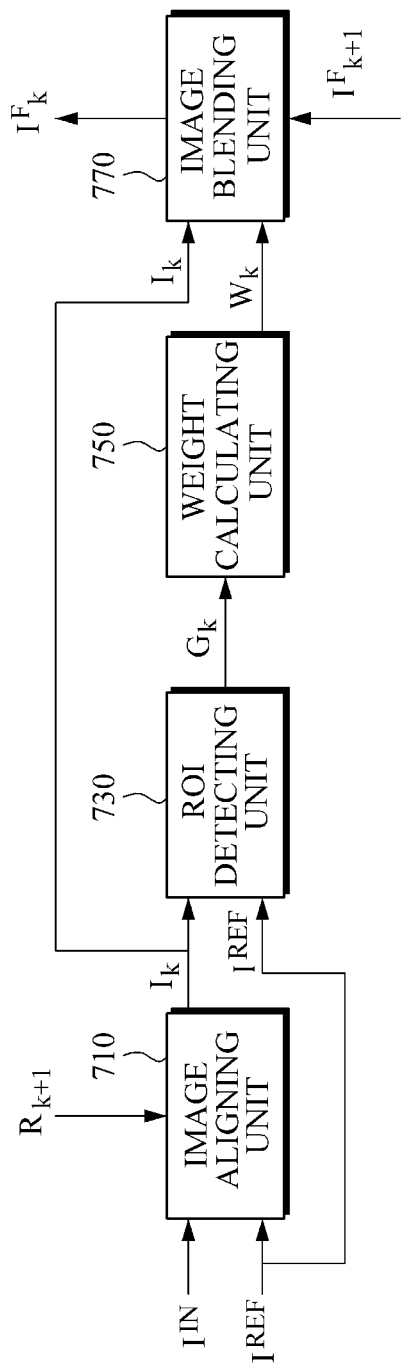
FIG. 3 is a block diagram of an image blender according to another example embodiment.

FIG. 3 is a block diagram of an image blender according to another example embodiment. The image blender may be implemented in a program with a single sub-routine. Alternatively, the image blender may be implemented in a single chip or semiconductor IP (Intellectual Property) core. Such modules may be cascaded to provide a better image blender.

An ROI detection or ghost detection process may be performed by setting an initial ROI, performing image alignment for the initial ROI, detecting a ghost in the ROI, and resetting another ROI. Accordingly, by iterating the image alignment and ghost detection process for each ROI, the image $I_k$ and the ghost region $G_k$, which may be aligned based on each ROI whenever the process is iterated, may be acquired. This is expressed as follows:

*Init*: given $R_0$ for $k=1$ to $K$ $I_k = T(I^{IN}, I^{REF}, R_{k-1})$ $G_k = GD(I_k, I_{REF})$, $R_k = R_{k-1} \cap G_k$ \quad (5)

A "deghosting process" is a process of continuously adding an aligned region in a ghost region. This is expressed as follows:

$$\text{Init}: I_{k+1}^F = I^{REF}$$

for $k=K$ to $1$ $$I_k^F = F(I_k, I_{k+1}^F, G_k) \quad (6)$$

Here, the term "F" refers to an ROI-based deghosting process.

By performing such iterative calculation, it may be possible to solve a number of stages of complex motion with a small amount of calculation.

FIG. 4 is a block diagram of a cascaded structure of a plurality of image blenders in FIG. 2 according to an example embodiment.

As shown in FIG. 4, the cascaded structure of image blenders may include a first image blender 100, a second image blender 300, and a third image blender 500. An overlapped portion between an ROI detected by an ROI detecting unit 130 of the first image blender 100 and an ROI of an image arranging unit 110 of the first image blender 100 may be set to an ROI in an image arranging unit 310 of the second image blender 300. An overlapped portion between an ROI detected by an ROI detecting unit 330 of the second image blender 300 and an ROI of an image arranging unit 310 of the second image blender 300 may be set to an ROI in an image arranging unit 510 of the third image blender 500.

Further, an image blended by an image blending unit 570 of the third image blender 500 may be input to the image blending unit 370 of the second image blender 300. An image blended by the image blending unit 370 of the second image blender 300 may be input to the image blending unit 170 of the first image blender 100.

Figure 5:
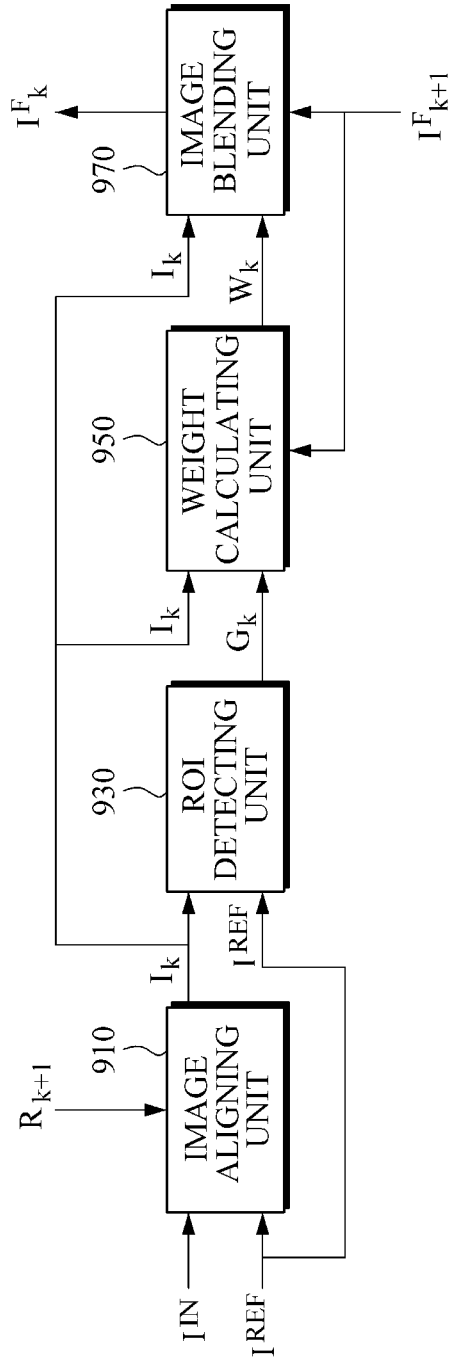
FIG. 5 is a block diagram of an image blender according to still another example embodiment.

FIG. 5 is a block diagram of an image blender according to another example embodiment.

A weight calculating unit 950 may calculate weights using image information in addition to the ghost region detected as an ROI to perform natural image blending and narrow a range of ghost region weights. For HDR image blending, if an image has a great deal of noise in a ghost region, a decreased range of weights may greatly reduce the effect of the noise.

That is, for ROI-based blending:

$$K_i(x) = \begin{bmatrix} 1 - \|ax\|_i, & \|ax\|_i < 1 \\ 0, & \text{otherwise} \end{bmatrix} \quad (7)$$

If $i=1$, the initial ROI may be set as follows:

$$W(x) = \begin{cases} 1, & x \in R \\ 0, & x \notin R \end{cases} \quad (8)$$

$$x = (x_0, x_1), \quad \alpha < 1 \quad (9)$$

A maximum value of a current weight and a weight decreased by a in a horizontal forward direction and a horizontal backward direction for each line $x_0$ may be selected. That is:

for $x1=1$ to $n$ $$W(x_0, x_1) = \max(W(x_0, x_1), W(x_0, x_1-1) - \alpha) \quad (10)$$

for $x1=1$ to $n$ $$W(x_0, x_1) = \max(W(x_0, x_1), W(x_0, x_1+1) - \alpha) \quad (11)$$

Next, the process may be further performed for $x_0$ and $x_1$ which may be switched. That is, this process may be performed in a vertical forward direction and a vertical backward direction column by column. Weighted blending may then be performed using the weight calculated in this process.

Further, the weights may be calculated using additional image information about a region other than the ghost region as an ROI to perform natural image blending and narrow a range of the weights. For example, the weights may be set to have a different attenuation depending on a difference in brightness level which occurs in the boundary of an ROI. In this case, α may be considered as:

$$f(|I_{k+1}^F(x) - I_K(x)|) \quad (12)$$

That is, to reduce a feathering width, α may need to become larger as a difference in brightness level between two images blended at the boundary of an ROI becomes smaller.

For another example, the weights may be set to have a different attenuation depending on a difference in brightness level which occurs in the boundary of another ROI. In this case, a may be considered as:

$$g(\Delta |I_{k+1}^F|) \quad (13)$$

That is, α may become smaller as an edge value becomes larger. For an edge portion in an image, the weights may need to be significantly attenuated to prevent the definition of an image from deteriorating due to a blurred edge.

Figure 6:
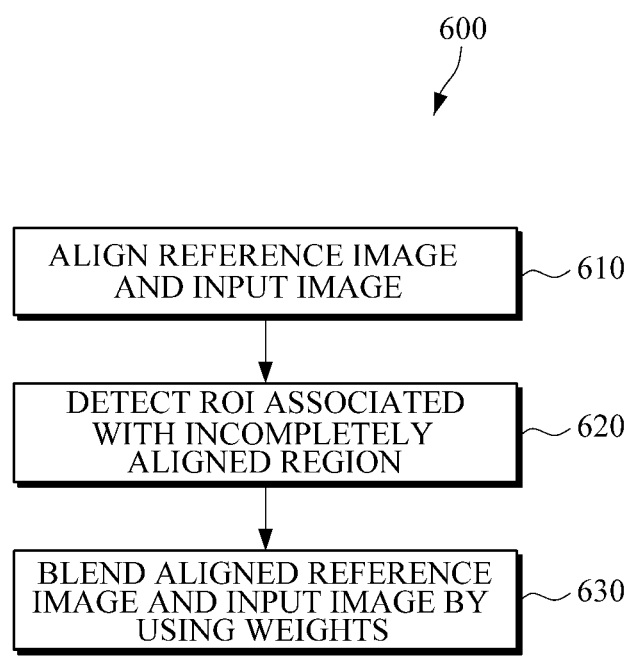
FIG. 6 is an example method for blending images.

FIG. 6 illustrates an example method for blending images. The method 600 includes aligning a reference image and an input image through region of interest (ROI)-based image alignment (operation 610), detecting an ROI associated with an incompletely aligned region in the aligned image (operation 620), and blending the aligned reference image and input image by using a plurality of weights which are attenuated according to a spatial distance from a boundary of the detected ROI (operation 630).

Figure 7:
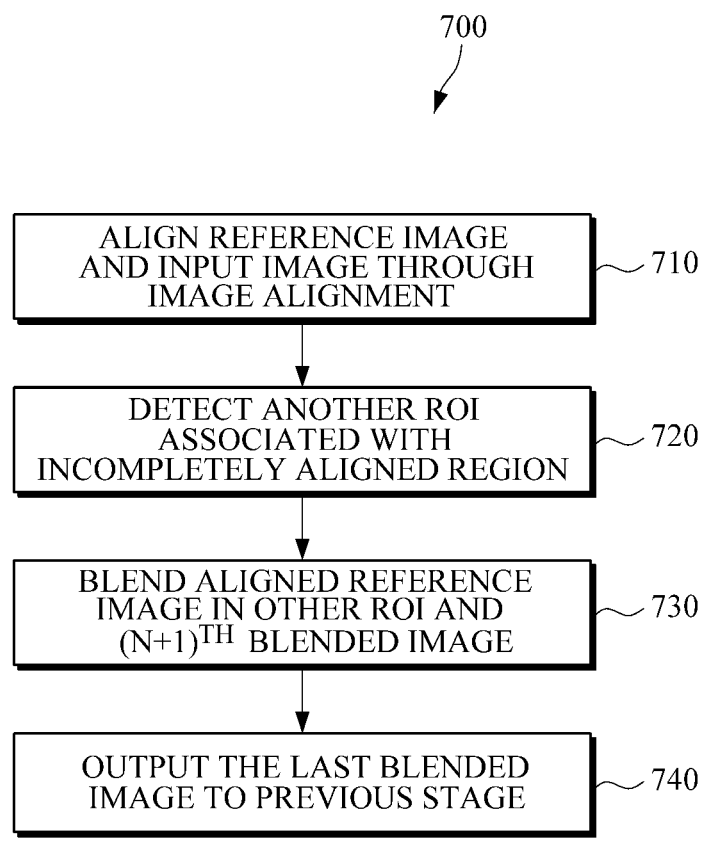
FIG. 7 is another example method for blending images.

FIG. 7 illustrates another example method for blending images. The method 700 includes aligning a reference image and an input image through image alignment based on an $n^{th}$ region of interest (ROI) which is detected at a previous stage (operation 710), detecting another ROI associated with an incompletely aligned region in the aligned image (operation 720), blending the aligned input image in the other ROI and an $(n+1)^{th}$ blended image, which is input from a next stage, in a region outside the other ROI (operation 730), and outputting the last blended image to the previous stage (operation 740).

The processes, functions, methods and/or software described above may be recorded, stored, or fixed in one or more computer-readable is storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM); random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner. As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup box, and the like consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for blending images, comprising:
   aligning a reference image and an input image through region of interest (ROI)-based image alignment;
   detecting an ROI associated with an incompletely aligned region in the aligned image; and
   blending the aligned input image and reference image by using a plurality of weights which are attenuated according to a spatial distance from a boundary of the detected ROI.

2. The method of claim 1, wherein blending the aligned input image and reference image comprises blending two images by taking the reference image in the ROI and the input image in a region outside the ROI.

3. The method of claim 1, wherein detecting the ROI comprises detecting a ghost.

4. The method of claim 1, wherein the weights are more greatly attenuated at an edge of an image than at other portions of the image.

5. The method of claim 1, wherein the weights are attenuated depending on a difference in brightness level which occurs in the boundary of the ROI.

6. A non-transitory computer-readable information storage medium storing a program for causing a computer to implement the method of claim 1.

7. A method for blending images, comprising:
   aligning a reference image and an input image through image alignment based on an $n^{th}$ region of interest (ROI) which is detected at a previous stage;
   detecting another ROI associated with an incompletely aligned region in the aligned image;
   blending the aligned image in the other ROI and an $(n+1)^{th}$ blended image, which is input from a next stage, in a region outside the other ROI; and
   outputting the last blended image to the previous stage.

8. The method of claim 7, wherein detecting the other ROI comprises detecting a ghost.

9. The method of claim 7, further comprising outputting an $(n+1)^{th}$ ROI, which is an overlapped portion between the $n^{th}$ ROI and the other ROI, to a next stage.

10. The method of claim 7, wherein blending the aligned image and the $(n+1)^{th}$ blended image comprises blending the two images by using a plurality of weights which are attenuated according to a spatial distance from a boundary of the other ROI.

11. The method of claim 10, wherein the weights are more greatly attenuated at an edge of an image than at the other portions of the image.

12. The method of claim 10, wherein the weights are attenuated depending on a difference in brightness level which occurs in the boundary of the other ROI.

13. A non-transitory computer-readable information storage medium storing a program for causing a computer to implement the method of claim 7.

14. An image blender, comprising:
   an image aligning unit configured to align a reference image and an input image through ROI-based image alignment;
   an ROI detecting unit configured to detect an ROI associated with an incompletely aligned region by detecting motion in an aligned image output from the image alignment unit;
   a weight calculating unit configured to calculate a plurality of weights which are attenuated depending on a spatial distance from a boundary of the ROI detected by the ROI detecting unit; and
   an image blending unit comprising a processor, the image blending unit configured to blend an aligned image output from the image aligning unit and a reference image according to the weights which are calculated by the weight calculating unit.

15. The image blender of claim 14, wherein the ROI detecting unit comprises a ghost detecting unit configured to detect a ghost.

16. An image blender, comprising:
   an image aligning unit configured to align a reference image and an input image through image alignment, based on an $n^{th}$ ROI which is detected at a previous stage;
   an ROI detecting unit configured to detect another ROI associated with an incompletely aligned region, based on motion detection in an aligned image output from the image aligning unit; and
   an image blending unit comprising a processor, the image blending unit configured to:
     blend the aligned input image in the other ROI and an $(n+1)^{th}$ blended image, which is input from a next stage, in a region outside the other ROI; and
     output the last blended image to the previous stage.

17. The image blender of claim 16, wherein the ROI detecting unit comprises a ghost detecting unit configured to detect ghosts, based on motion detection in the aligned image output from the image aligning unit.

18. The image blender of claim 16, wherein the ROI detecting unit is further configured to output an $(n+1)^{th}$ ROI, which is an overlapped portion between the $n^{th}$ ROI and the other ROI, to a next stage.

19. The image blender of claim 16, further comprising a weight calculating unit configured to calculate a plurality of weights, the image blending unit being further configured to blend the two images using the plurality of weights, the plurality of weights being attenuated depending on a spatial distance from a boundary of the other ROI.

20. An image blending apparatus, comprising:
a plurality of image blenders, at least two of the plurality of image blenders comprising:
an image aligning unit configured to align a reference image and an input image through image alignment, based on an $n^{th}$ ROI which is detected at a previous stage;
an ROI detecting unit configured to detect another ROI associated with an incompletely aligned region, based on motion detection in an aligned image output from the image aligning unit; and
an image blending unit comprising a processor, the image blending unit configured to:
blend the aligned image in the other ROI and an $(n+1)^{th}$ blended image, which is input from a next stage, in a region outside the other ROI; and
output the last blended image to the previous stage.

21. The image blending apparatus of claim 20, wherein the plurality of image blenders are cascaded.

22. The image blending apparatus of claim 21, wherein an initial ROI of the first stage image blender is set to a low-brightness region, or a high-brightness region.

* * * * *